US009916172B2

(12) United States Patent
Lee et al.

(10) Patent No.: US 9,916,172 B2
(45) Date of Patent: Mar. 13, 2018

(54) METHOD AND APPARATUS FOR RECOVERING LOCK HOLDER PREEMPTION

(71) Applicants:Samsung Electronics Co., Ltd., Gyeonggi-do (KR); SNU R&DB Foundation, Seoul (KR)

(72) Inventors: Jin Ho Lee, Seoul (KR); Yong Seok Park, Gyeonggi-do (KR); Jong Hun Yoo, Seoul (KR); Seong-Soo Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 14/383,532

(22) PCT Filed: Mar. 5, 2013

(86) PCT No.: PCT/KR2013/001725
§ 371 (c)(1),
(2) Date: Sep. 5, 2014

(87) PCT Pub. No.: WO2013/133586
PCT Pub. Date: Sep. 12, 2013

(65) Prior Publication Data
US 2015/0033228 A1 Jan. 29, 2015

(30) Foreign Application Priority Data
Mar. 6, 2012 (KR) ........................ 10-2012-0022971

(51) Int. Cl.
*G06F 9/455* (2006.01)
*G06F 9/48* (2006.01)
*G06F 9/52* (2006.01)
*G06F 11/30* (2006.01)

(52) U.S. Cl.
CPC .......... *G06F 9/45533* (2013.01); *G06F 9/526* (2013.01); *G06F 9/4856* (2013.01);
(Continued)

(58) Field of Classification Search
None
See application file for complete search history.

(56) References Cited

U.S. PATENT DOCUMENTS

| 8,918,788 | B2 * | 12/2014 | Grouzdev | ............. | G06F 9/4881 |
| | | | | | 718/103 |
| 2004/0230972 | A1 * | 11/2004 | Donovan | ............ | G06F 9/45533 |
| | | | | | 718/1 |

(Continued)

FOREIGN PATENT DOCUMENTS

KR  10-2009-0106392  10/2009
KR  10-2012-0009907  2/2012

OTHER PUBLICATIONS

Hohmuth, Pragmatic nonblocking synchronization for real-time systems, 2001, Usenix Conference, p. 1-15.*

(Continued)

*Primary Examiner* — Lewis A Bullock, Jr.
*Assistant Examiner* — Bruce S Ashley (57) ABSTRACT

According to one embodiment of the present invention, the scheduling method includes an acquisition step of acquiring operation state information on a virtual CPU (vCPU) and lock information on an OS in the operation of the vCPU and of a virtual machine (VM) driving the vCPU and including the OS, and a determination step for determining whether the vCPU is in a lock holder preemption (LHP) state on the basis of the operation state information and the lock information. According to one embodiment of the present invention, the LHP can be easily and precisely known on a system using the VM. Also, even with an increase in the number of cores, scalability can be supported in a system by adjusting (Continued)

the pCPU to which operations of the vCPU are allocated through a scheduling scheme. In addition, a fairness hindering problem between the existing technology and the VM can be solved by adjusting the operations for each vCPU and continuously performing a critical section of a lock holder by using a time quantum allocated to a lock contender vCPU which awaits a lock release.

18 Claims, 10 Drawing Sheets

(52) U.S. Cl.
CPC .......... *G06F 9/4881* (2013.01); *G06F 11/301* (2013.01); *G06F 11/3055* (2013.01); *G06F 2209/483* (2013.01)

(56) References Cited

U.S. PATENT DOCUMENTS

| | | | |
|---|---|---|---|
| 2006/0271931 A1* | 11/2006 | Harris | G06F 9/52 718/1 |
| 2006/0277551 A1 | 12/2006 | Accapadi et al. | |
| 2008/0184249 A1* | 7/2008 | Adams | G06F 9/526 718/104 |
| 2011/0119422 A1 | 5/2011 | Grouzdev | |
| 2011/0119667 A1* | 5/2011 | Srinivasan | G06F 11/301 718/1 |

OTHER PUBLICATIONS

Friebel, How to Deal with Lock Holder Preemption, 2009, AMD Operating System Research Center, p. 1-4.*
Bai, Yuebin et al, "Task-Aware based Co-scheduling for Virtual Machine System", Mar. 22, 2010, Proceedings of the 2010 ACM Symposium on Applied Computing, pp. 181-188.*
International Search Report dated Jun. 27, 2013 in connection with International Patent Application No. PCT/KR2013/001725, 5 pages.
Written Opinion of International Searching Authority dated Jun. 27, 2013 in connection with International Patent Application No. PCT/KR2013/001725, 5 pages.

* cited by examiner

METHOD AND APPARATUS FOR RECOVERING LOCK HOLDER PREEMPTION

CROSS-REFERENCE TO RELATED APPLICATION(S)

The present application claims priority under 35 U.S.C. §365 to International Patent Application No. PCT/KR2013/001725 filed Mar. 6, 2013, entitled "METHOD AND APPARATUS FOR RECOVERING LOCK HOLDER PREEMPTION". International Patent Application No. PCT/KR2013/001725 claims priority under 35 U.S.C. §365 and/or 35 U.S.C. §119(a) to Korean Patent Application No. 10-2012-0022971 filed Mar. 6, 2012, and which are incorporated herein by reference into the present disclosure as if fully set forth herein.

TECHNICAL FIELD

The present invention relates to a scheduling method and apparatus for detecting Lock Holder Preemption (LHP) and resolving LHP through data structure sharing between the Virtual Machine Monitor (VMM) and Operating System (OS) in a system using a Virtual Machine.

BACKGROUND ART

Virtualization is a technology for virtualizing a hardware system into a plurality of virtual hardware systems. As the key technology of virtualization, the VMM is interposed between the physical hardware and the OS to provide the higher layer with virtual hardware resources. The virtual hardware provided by the VMM is referred to as Virtual Machine (VM), and the OS using the VM is referred to as guest OS. The CPU running on the physical hardware is referred to as physical CPU (pCPU), and the CPU provided to the VM is referred to as virtual CPU (vCPU).

The conventional virtualization technology has a problem in that the scalability drops as the number of cores increases when a plurality of guest OSs holds spinlocks on the multi-cores. The spinlocks are mainly used when the critical section is so short such that busy-waiting is better than blocking in order to hold the lock. However, if the vCPU holding a spinlock is preempted by other vCPUs, the other vCPUs trying to acquire the same lock are kept busy-waiting during the preemption. This extends the typical waiting time from a few μs to a few dozen μs and up to a few dozen ms so as to cause unnecessary waste of CPU resource and performance degradation. This problem is called Lock Holder Preemption (LHP).

The scheduling technique proposed to solve this problem has introduced other problems such as resource fragmentation and violation of fairness among the processes. There is therefore a need of a method capable of improving system resource utilization efficiency while achieving fairness among the processes.

DISCLOSURE OF INVENTION

Technical Problem

The present invention has been conceived to solve the above problem and aims to provide a method for the VM to detect LHP and resolving the LHP through a scheduling technique.

Solution to Problem

In accordance with an aspect of the present invention, a scheduling method includes acquiring operation state information of a virtual CPU (vCPU) and a virtual machine including an OS operating the vCPU and lock information of the OS and determining whether the vCPU is in a Lock Holder Preemption (LHP) state based on the operation state information and the lock information.

In accordance with another aspect of the present invention, an operation apparatus includes a virtual machine including virtual CPUs (vCPUs) and an Operating System (OS) executing tasks through the vCPUs, a physical machine including physical CPUs (pCPUs) executing tasks requiring the virtual machine, a Virtual Machine Monitor (VMM) which is connected to the virtual machine and the physical machine, a memory unit which is connected to the virtual machine and the VMM and stores data, and a control unit which is connected to the virtual machine, the VMM, and the memory unit and controls operations, wherein the memory unit stores operation state information of the vCPU and lock information of the OS and determines whether the vCPU is in a Lock Holder Preemption (LHP) state based on the information stored in the memory unit.

Advantageous Effects of Invention

The method and apparatus for resolving the LHP according to the present invention is advantageous in terms of checking LHP precisely and effectively on the system using a VM. Also, the method and apparatus for resolving the LHP according to the present invention is advantageous in terms of achieving scalability, even when the number of cores increases in the system, by controlling the pCPU allocated operations of vCPUs through a scheduling technique.

Also, the method and apparatus for resolving the LHP according to the present invention is advantageous in terms of solving the fairness violation problem among the VMs in the conventional technology by allowing the lock holder to keep the lock for the critical section using the time quantum allocated to the lock contender vCPUs waiting for the release of the lock.

Also, the method and apparatus for resolving the LHP according to the present invention is advantageous in terms of avoiding excessive runtime overhead of the system by obviating the need of mode switching between the guest OS and VMM when LHP does not occur.

MODE FOR THE INVENTION

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

A description is made of the method and apparatus for detecting and resolving LHP at the VM according to embodiments of the present invention in detail hereinafter with reference to accompanying drawings.

Figure 1:
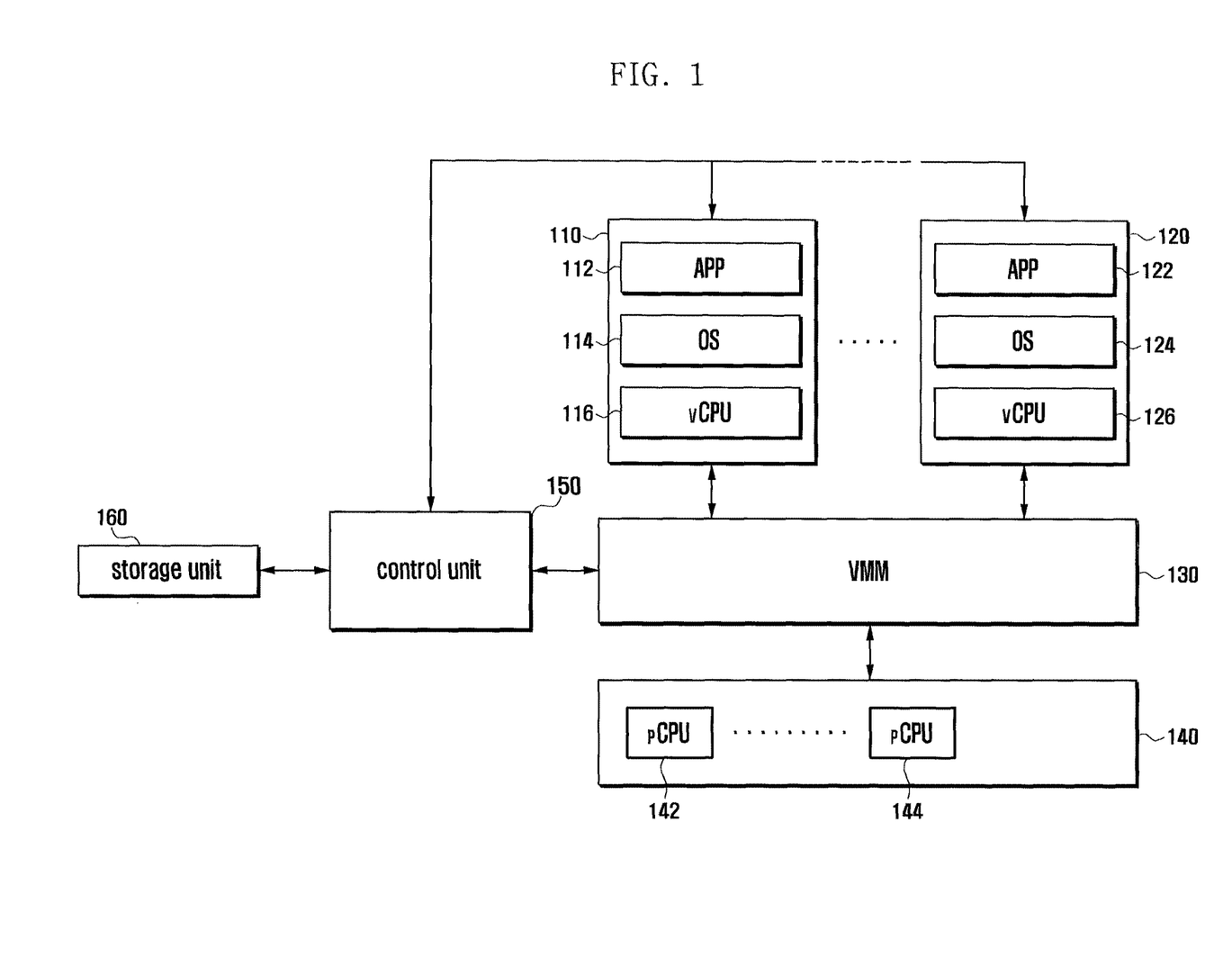
FIG. 1 is a block diagram illustrating Virtual Machine (VM) and physical hardware according to an embodiment of the present disclosure.

FIG. 1 is a block diagram illustrating Virtual Machine (VM) and physical hardware according to an embodiment of the present invention.

Referring to FIG. 1, the embodiment may include one or more VMs 110 and 120. Each VM may include applications 112 and 122, OSs 114 and 124, and virtual CPUs (vCPUs) 116 and 126. The OSs 114 and 124 run on the vCPUs 116 and 126 and may allocate operations necessary for executing the applications 112 and 122. With this configuration, it is possible to run a plurality of virtual hardware components on a single hardware component so as to multiplex the physical computers.

The embodiment includes a physical device 140 having one or more physical CPUs (pCPUs) 142 and 144 and a Virtual Machine Monitor (VMM) 130 connecting the VMs 110 and 120 and the physical device 140 and allocating operations necessary for the VMs 110 and 120 to the pCPUs 142 and 144. The VMM 130 may allocate physical resource to the VMs 110 and 120, if necessary.

The embodiment may further include a control unit 150 connected to the VMs 110 and 120 and VMM 130 and capable of receiving operation information and controlling the operations. Although the control unit 150 is implemented independently, the present invention may be implemented by configuring the respective VMs 110 and 120 and VMM 130 to have respective controls units communicating among each other.

The control unit 150 connects to the VMs 110 and 120 and may receive information on the vCPU which has acquired specific lock through the OSs 114 and 124 and information on at least one of a set of vCPUs waiting for the release of the lock and a set of locks acquired by a specific vCPU.

Also, the control unit 150 connects to the VMM 130 and may receive state mapping information loaded on the respective vCPUs through the VMM 130. The operation state of the vCPU may be one of running or preempted, and the data structure for storing this is described later.

The control unit 150 may store the information received from the VMs 110 and 120 and the VMM 130 in the storage unit 160 connected thereto. The storage unit 160 may be configured in such a way of being connected to the control unit 150 and may be positioned inside the control unit 150 depending on the embodiment.

In an embodiment, the VMs 110 and 120 and the VMM 130 are connected through the control unit 150 and may have data structure sharing the lock information of the running processes and operation information of the vCPU so as to detect the LHP state accurately and provide a scheduling method for solving the LHP. The LHP checking and scheduling method is described later.

Figure 2:
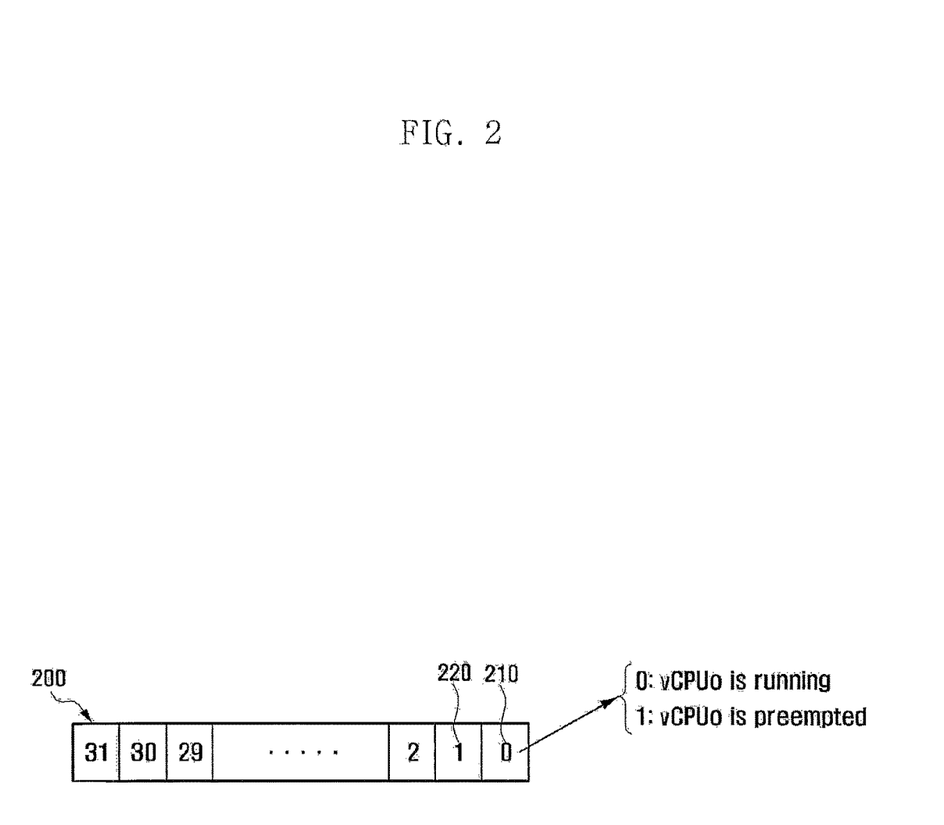
FIG. 2 is a diagram illustrating data structure of the state information of the vCPU.

FIG. 2 is a diagram illustrating data structure of the state information of the vCPU.

Referring to FIGS. 1 and 2, the state information 200 of the vCPU according to an embodiment may be formed as a bitmap made up of bits set to one of two state values for the respective vCPU IDs 210 and 220. The ID of each vCPU may be expressed as a value and, in the drawing, a bitmap consists of total 32 bits indicating states of vCPUs. Each bit may indicate whether the vCPU is running or preempted and, in this embodiment, the corresponding ID is set to 0 to indicate that the vCPU is running or 1 to indicate that the vCPU is preempted. The value may be allocated differently depending on the embodiment.

The state information of the vCPU may be recorded by the VMM 130. The VMM 130 assigns the operations which the VMs 110 and 120 allocate to the vCPUs to the pCPUs 142 and 144 so as to determine whether the vCPUs are running or preempted currently. The state information of the vCPUs may be transferred to the control unit 150 and stored in the storage unit 160.

Figure 3:
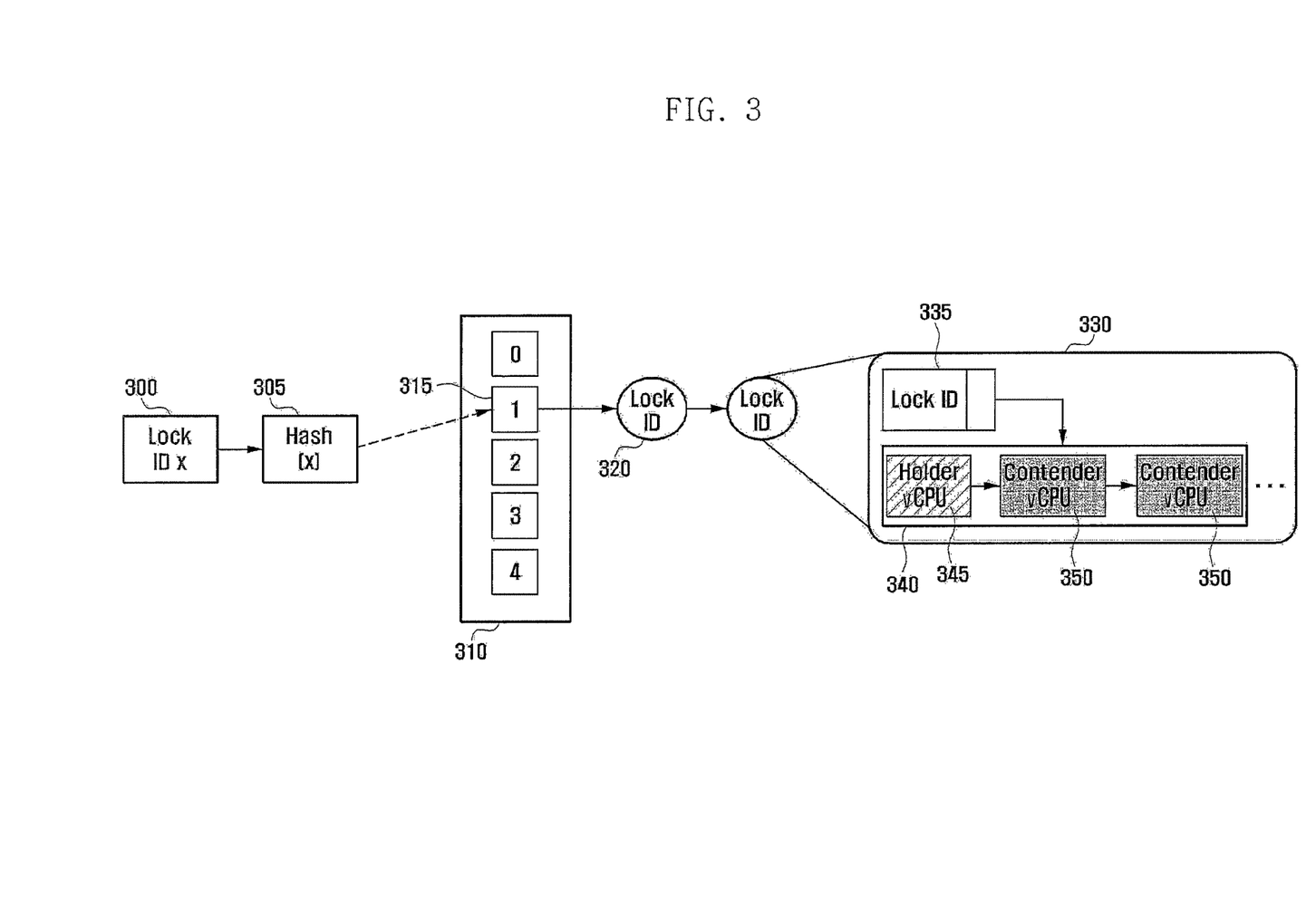
FIG. 3 is a diagram illustrating data structure of the lock holder and lock contenders.

FIG. 3 is a diagram illustrating the data structure of the lock holder and lock contenders.

Referring to FIGS. 1 and 3, the lock may include a lock ID 300 and the holder and contenders may be recorded in the hash tables 310 and 330 according to an embodiment.

The holder value maps the lock ID 300 to the lock holder vCPU, and the contenders map the lock ID 300 to the lock contender vCPUs.

In the case where the lock ID 300 is x, the hash value 305 may be obtained and recorded in the tables. In an embodiment, the hash value 305 of the lock ID 300 corresponds to the table 315, and the holder information and contenders information may be recorded as a value of the lock ID 320 in the table 1 315.

The hash tables 310 and 330 may record the information including the lock ID 335 and a list of vCPUs trying to acquire the corresponding lock. The vCPU 345 acquiring the lock first in the list 340 of the vCPU is the holder vCPU which has acquired the lock having the lock ID 335, and the vCPUs 350 below the holder vCPU are the contender vCPUs waiting for the release of the lock.

The information on the holder and the contenders corresponding to the lock ID 300 may be acquired by the OSs 114 and 124 and stored in the storage unit 160, and the VMM 130 may reference the recorded lock-related information.

By recording the lock-related information in this way, the VMM 130 is capable of acquiring the information on the vCPU related to the corresponding lock effectively and accurately.

Figure 4:
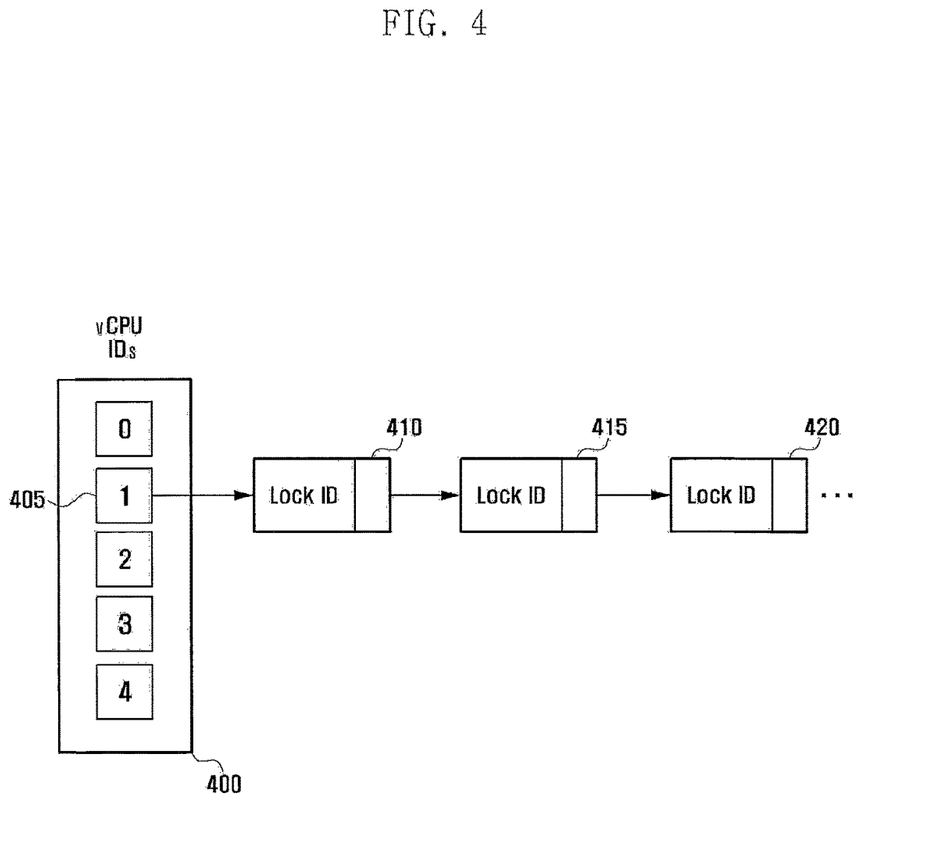
FIG. 4 is a diagram illustrating the data structure of expressing the lock acquired by the vCPU.

FIG. 4 is a diagram illustrating the data structure of expressing the lock acquired by the vCPU.

The locks 410, 415, and 420 acquired per vCPU ID 405 in the set of vCPUs are stored in the table. The lock table maps the vCPU to the set of locks acquired by the corresponding vCPU. This information is recorded by the OSs 114 and 124 and may be read by the VMM 130 for use.

One vCPU may acquire a plurality of locks and it is possible to check LHP effectively and accurately by recording the locks acquired by the vCPU in this way.

Figure 5:
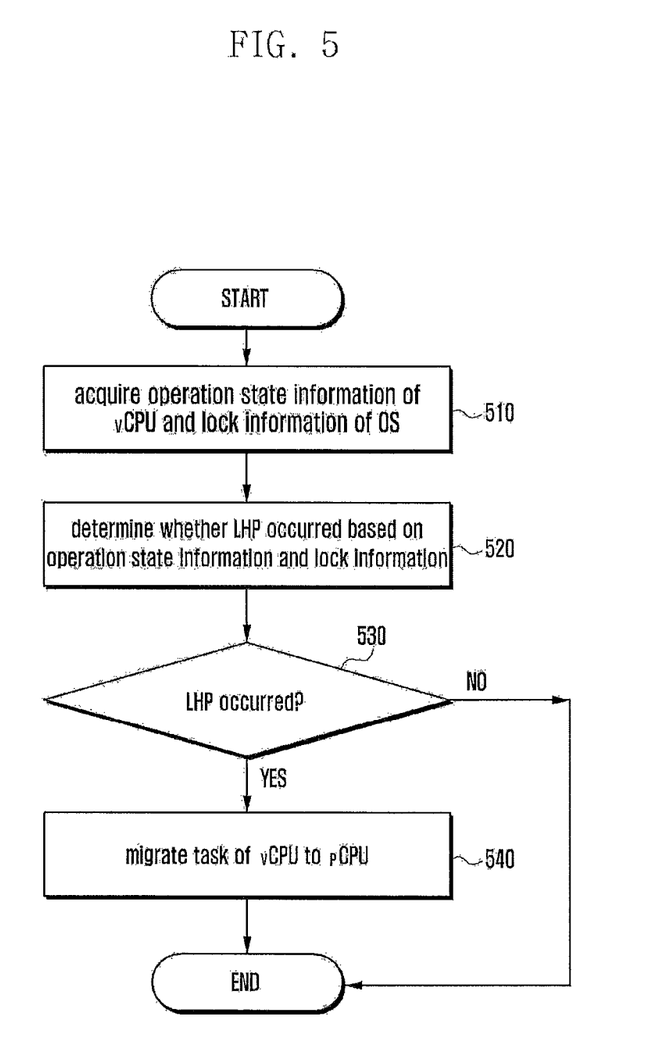
FIG. 5 is a flowchart illustrating a scheduling method according to an embodiment.

FIG. 5 is a flowchart illustrating a scheduling method according to an embodiment.

Referring to FIG. 5, the VMM acquires the operation state information of the vCPU and the lock information of the OS at step 510.

The operation state information of the vCPU may include the information indicating whether the corresponding vCPU is running or preempted. This information may be recorded by the VMM.

The lock information of the OS may include at least one of the information on the lock holder that has acquired the corresponding lock, a list of the contenders waiting for the release of the acquired lock, and a list of the locks acquired by the vCPU. This information may be recorded by the OS.

At step 520, the VMM may determine whether LHP has occurred based on the vCPU operation state information and the lock information acquired at step 510. Whether LHP has occurred may be determined by at least one of the OS and the VMM. A detailed description thereof is made later.

If it is determined that LHP has occurred at step 530, the procedure goes to step 540 to deal with the LHP and, otherwise, ends the determination to return to the normal procedure.

If LHP has occurred, the VMM may allocate the operation of the vCPU to a pCPU at step 540. This may be performed by the VMM and may solve the process efficiency degradation, resource fragmentation, and unfairness caused by LHP. A detailed description of the allocation procedure is made later.

Figure 6:
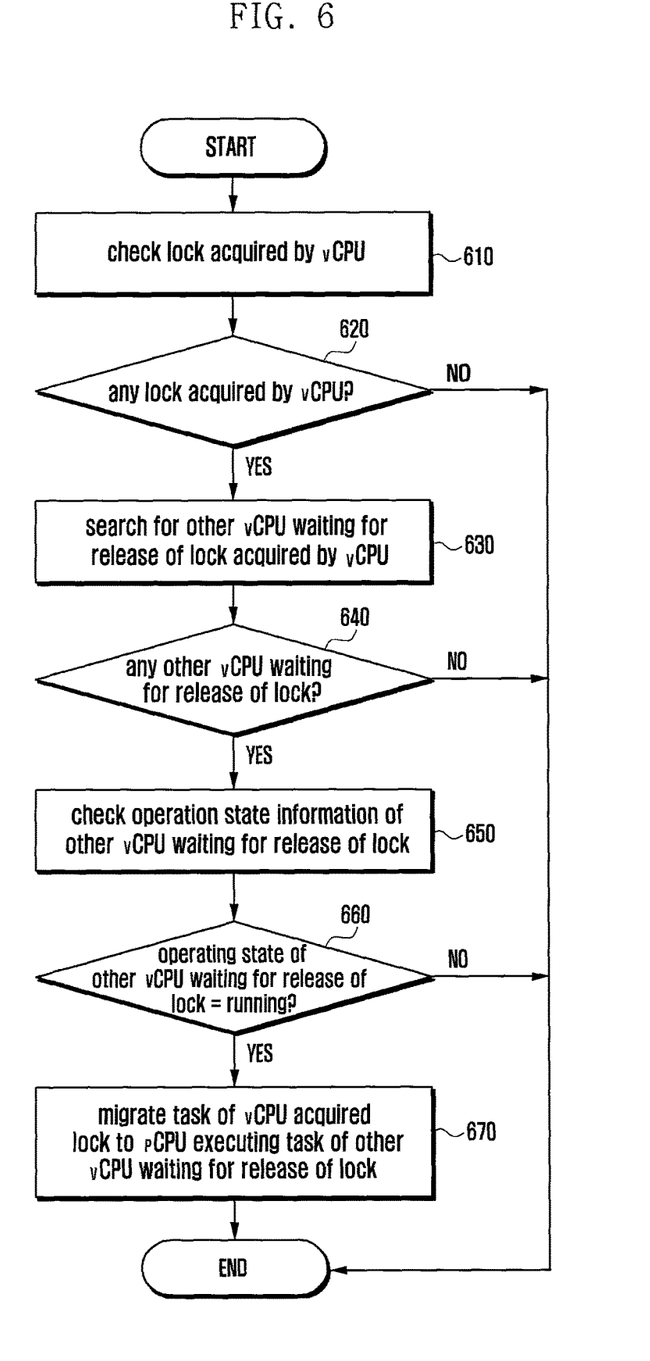
FIG. 6 is a flowchart illustrating an LHP determination and scheduling method according to an embodiment.

FIG. 6 is a flowchart illustrating an LHP determination and scheduling method according to an embodiment.

Referring to FIG. 6, the VMM may check the lock acquired by a specific vCPU at step 610. The specific vCPU is determined by the VMM when it is necessary to preempt the vCPU. The lock acquired by the vCPU may be checked through the data structure described with reference to FIG. 4.

If there is no lock acquired by the specific vCPU at step 620, this means LHP has not occurred and thus the determination ends to return to the normal process.

If there is any lock acquired by the specific vCPU, the VMM searches for other vCPUs waiting for the release of the lock acquired by the specific vCPU at step 630. The vCPU waiting for the release of the lock may be found by the VMM among the contenders described with reference to FIG. 3.

If there are no other vCPUs waiting for the release of the lock at step 640, this means that no LHP has occurred and thus ends the determination to return to the normal process.

If there is any vCPU waiting for the release of the lock, the VMM checks the operation state information of other vCPU waiting for the release of the lock at step 650. The operation state of other vCPU waiting for the release of the lock may be determined in such a way that the VMM to check the data structure described with reference to FIG. 2 or the state where the vCPU has been assigned directly to the pCPU.

If the operation state of other vCPU waiting for the release of the lock is 'preempted' state at step 660, this means that no LHP has occurred and thus ends the determination to return to the normal process.

If the operation state of other vCPU waiting for the release of the lock is 'running' state, this means that the LHP has occurred and thus the procedure goes to step 670.

At step 670, since the LHP has occurred, the VMM may perform migration for allocating the operation of the vCPU that acquired the lock to a pCPU. A method of determining the pCPU to which the operation is migrated is described later and, preferably, migration may be performed to the pCPU carrying out the operation of the other vCPU waiting for the release of the lock.

Figure 7:
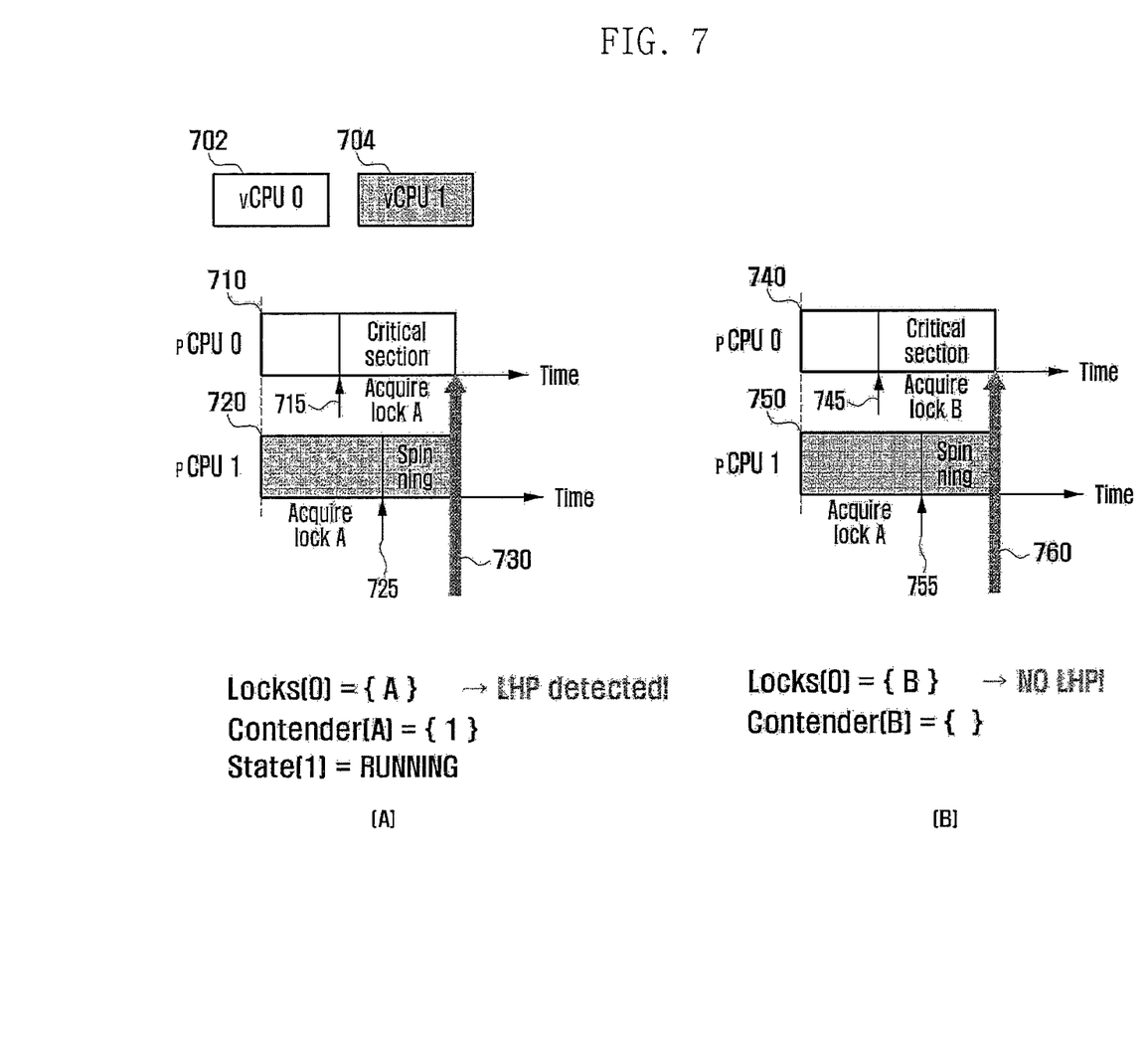
FIG. 7 is a timing diagram illustrating operations of the pCPU with and without occurrence of LHP according to an embodiment.

FIG. 7 is a timing diagram illustrating operations of the pCPU with and without occurrence of LHP according to an embodiment.

Referring to FIG. 7, the first block 702 shows that the corresponding pCPU executes the task of vCPU 0, and the second block 704 shows that the corresponding pCPU executes the task of vCPU 1.

Part (A) of FIG. 7 shows the task of the vCPU which is executed by the pCPU 0 710 and the pCPU 1 720.

The pCPU 0 710 is executing the task of the vCPU 0, and the vCPU 0 acquires the lock with the lock ID of A to use the critical section at time 715. Since the vCPU 0 has acquired the lock A, the lock holder of the lock A is the vCPU 0.

The pCPU 1 720 is executing the task of the vCPU 1, and the vCPU 1 tries to acquire the lock with lock ID of A at time 725. However, since the vCPU 0 has acquired the lock with the lock ID A already at time 715, the vCPU 1 is spinning to wait for the release of the lock.

If the vCPU 0 is preempted at time 730, it may be determined that LHP has occurred because the vCPU 0 as the lock holder acquired the lock A has been preempted and the state information of vCPU 1 has been in the 'running' state.

Part (B) of FIG. 7 shows the task of the vCPU which is executed by the pCPU 0 740 and the pCPU 1 750.

The pCPU 0 740 is executing the task of the vCPU 0, and the vCPU 0 acquires the lock with the lock ID of B to use the critical section at time 745. Since the vCPU 0 has acquired the lock B, the lock holder of the lock B is the vCPU 0.

The pCPU 1 750 is executing the task of the vCPU 1, and the vCPU 1 tries to acquire the lock with the lock ID of A. In this embodiment, since the lock B is not acquired by any vCPU, the vCPU 1 may acquire the lock A.

Since there is no contender for the lock B even when the vCPU 0 is preempted, no LHP occurs.

Figure 8:
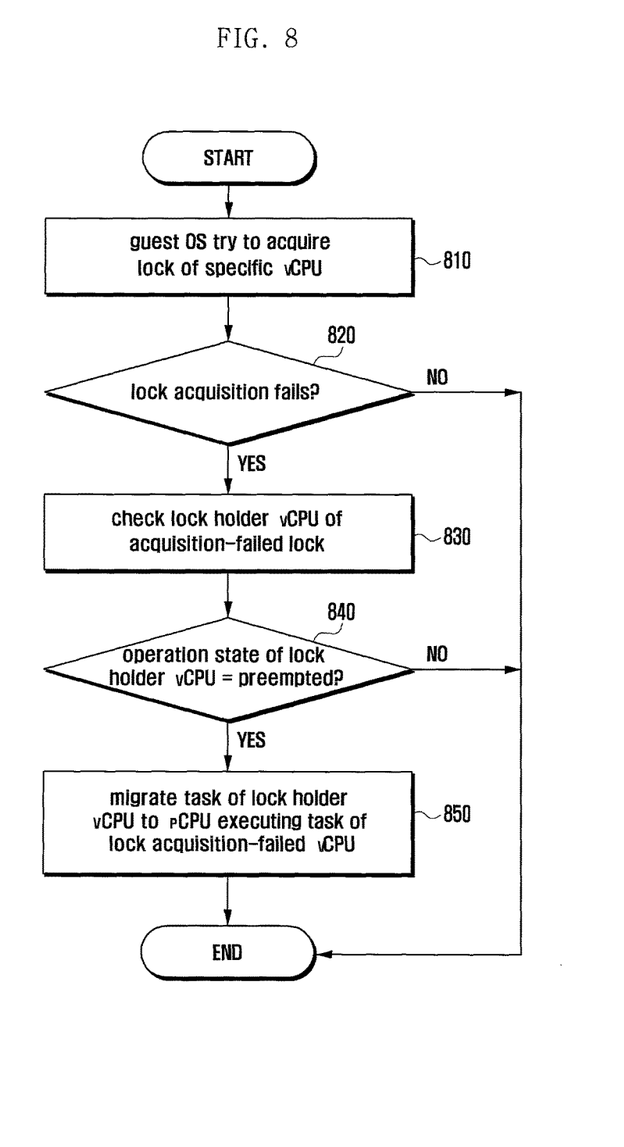
FIG. 8 is a flowchart illustrating the LHP determination and scheduling method according to another embodiment.

FIG. 8 is a flowchart illustrating the LHP determination and scheduling method according to another embodiment.

Referring to FIG. 8, a guest OS tries to acquire a specific lock related to the task executed by a specific vCPU at step 810. The guest OS denotes the OS operating on a VM.

If the specific lock is acquired successfully at step 820, this means that no LHP has occurred and thus ends the determination to return the normal process.

If it fails to acquire the specific lock, the guest OS searches for the lock holder vCPU of the acquisition-failed lock at step 830. The lock holder vCPU may be checked through the data structure described with reference to FIG. 3.

At step 840, the guest OS determines the operation state of the lock holder vCPU found at step 830. The operation state of the lock holder vCPU may be checked in the data structure described with reference to FIG. 2. If the operation state of the lock holder vCPU is 'running', this means that LHP has not occurred and thus ends the determination to return to the normal process.

If the operation state of the lock holder vCPU is 'preempted', this means that LHP has occurred and thus the procedure progresses to the next step.

At step 850, a migration may be performed to allocate the task of the vCPU that acquired the lock to a pCPU in order to resolve the LHP. A description is made of the method for determining the pCPU to migrate the task at a later time and, preferably, it is preferred to migrate to the pCPU executing the task of other vCPU waiting for the release of the lock.

Figure 9:
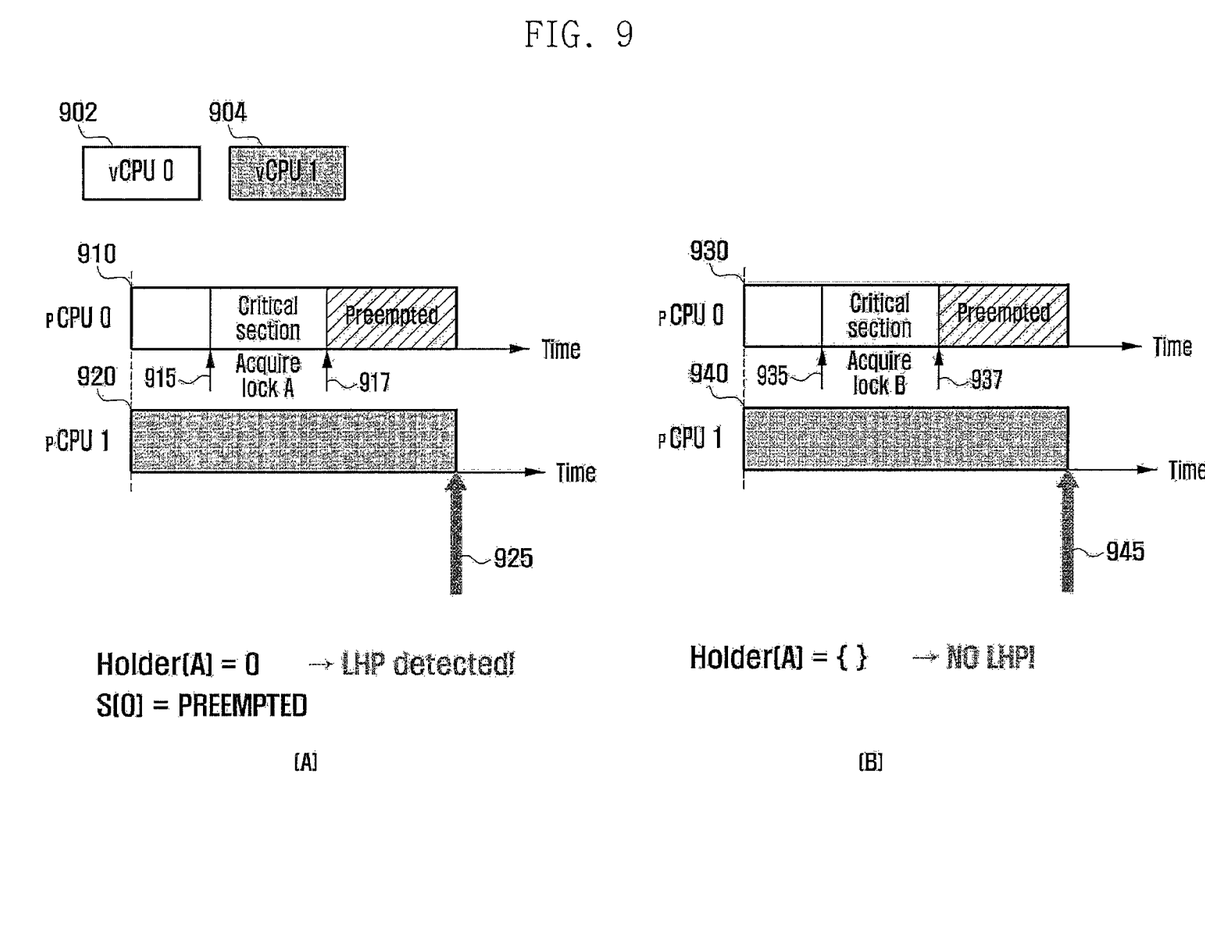
FIG. 9 is a timing diagram illustrating the operation of pCPU with and without occurrence of LHP according to another embodiment.

FIG. 9 is a timing diagram illustrating the operation of pCPU with and without occurrence of LHP according to another embodiment.

Referring to FIG. 9, the first block 902 shows that the corresponding pCPU executes the task of vCPU 0, and the second block 904 shows that the corresponding pCPU executes the task of vCPU 1.

Part (A) of FIG. 9 shows the task of the vCPU which is executed by the pCPU 0 910 and the pCPU 1 920.

The pCPU 0 910 is executing the task of the vCPU 0, and the vCPU 0 acquires the lock with the lock ID A to use the critical section at time 915. Since the vCPU 0 has acquired the lock A, the lock holder of the lock A is the vCPU 0. After finishing the use of the critical section, the vCPU 0 is preempted at time 917.

The vCPU 1 tries to acquire the lock with the ID of A at time 925. However, since the vCPU 0 has acquired the lock with the lock ID A already at time 915, the vCPU 1 is spinning to wait for the release of the lock. If the vCPU 1 fails to acquire the lock A, the VMM searches for the holder information on the lock A. In an embodiment, the holder of the lock A is the vCPU 0. In this case, the vCPU 0 searches for the operation state information. In an embodiment, if the vCPU 0 is preempted as described above, LHP occurs.

Part (B) of FIG. 9 shows the task of the vCPU which is executed by the pCPU 0 930 and the pCPU 1 940.

The pCPU 0 930 is executing the task of the vCPU 0, and the vCPU 0 acquires the lock with the lock ID of B to use the critical section at time 935. Since the vCPU 0 has acquired the lock B, the lock holder of the lock B is the vCPU 0. After finishing the use of the critical section, the vCPU 0 is preempted at time 937.

The vCPU tries to acquire the lock with ID A at time 945. At this time, since there is no vCPU which has acquired the lock A, the vCPU 1 acquires the lock A such that LHP does not occur.

Figure 10:
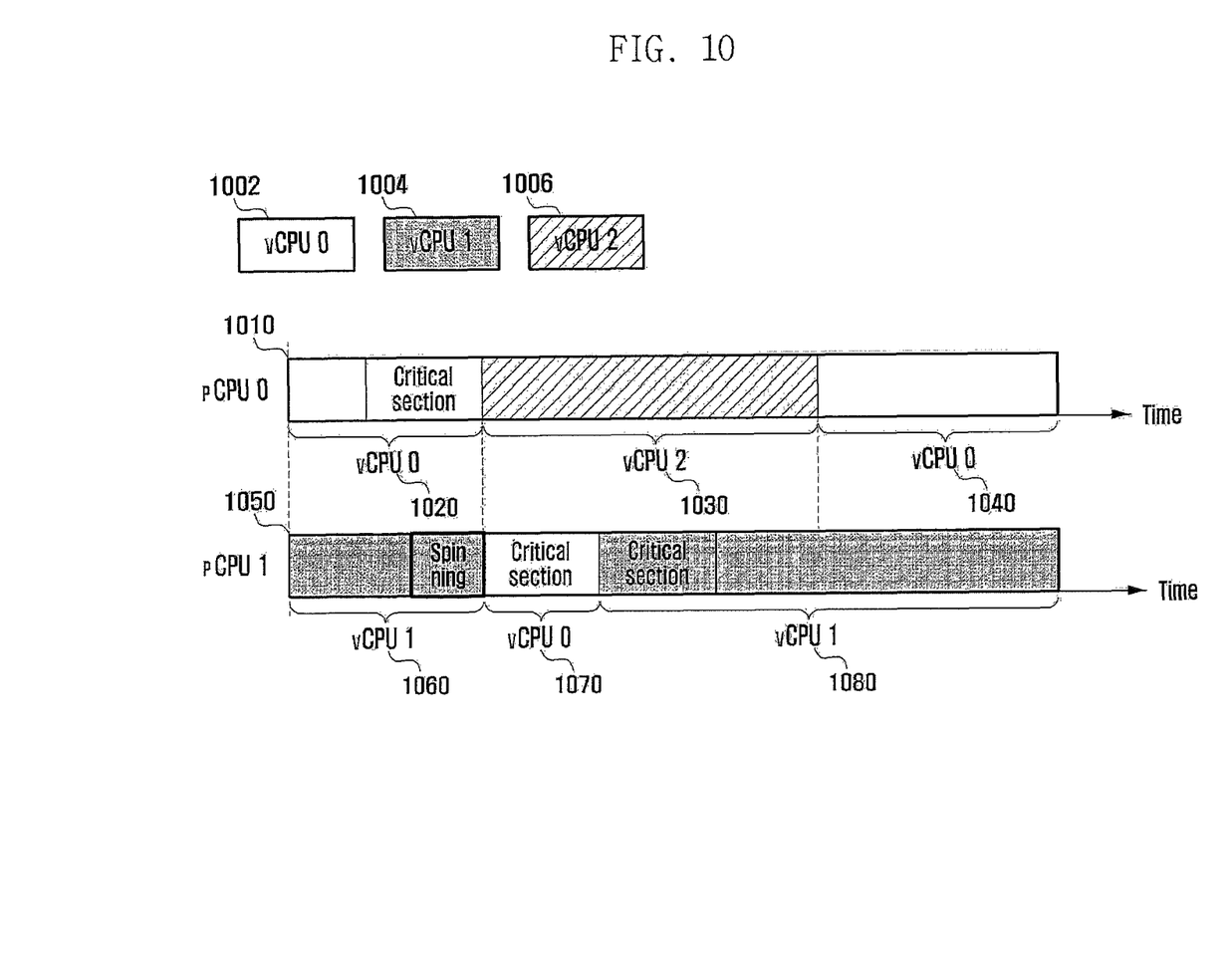
FIG. 10 is a timing diagram illustrating operations of pCPU for controlling tasks through scheduling in an LHP situation.

FIG. 10 is a timing diagram illustrating operations of pCPU for controlling tasks through scheduling in LHP situation.

Referring to FIG. 10, the first block 1002 shows that the corresponding pCPU 0 executes the task of the vCPU 0, the second block 1004 shows that the corresponding pCPU 1 executes the task of the vCPU 1, and the third block shows that the corresponding pCPU 0 executes the task of the vCPU 2. Also, the tasks of the respective vCPUs executed by the pCPU 0 1010 and the pCPU 1 1050 are shown.

In an embodiment, the vCPU 0 acquires the lock A, and the vCPU 1 is a contender for the lock A.

The task of the vCPU 0 is executed by the pCPU and is followed by the critical section as denoted by reference number 1020. The vCPU 2 preempts the vCPU 0 as denoted by reference number 1030. If the vCPU 2 is preempted, the pCPU 0 1010 executes the task of the vCPU 2 1030.

Since the lock A is not released as denoted by reference number 1060, it spins to wait for the release of the lock, resulting in LHP.

The VMM may detect the occurrence of LHP by itself or by receiving a hyper call from the OS. In this case, the task of the vCPU 0 which is executed at the pCPU 0 1010 is migrated to the pCPU 1 1050 on which the vCPU 1 as a contender for the lock A is spinning as denoted by reference number 1070.

If the pCPU 1 1010 completes the task related to the critical section of the vCPU 0 1070, the OS notifies the VMM of the release of the lock A through the hyper call, and the VMM schedules the vCPU 1 as the lock contender as denoted by reference number 1080.

Also, the pCPU 0 1010 may execute the task of the vCPU 1040.

By migrating, when LHP occurs, the lock holder task to execute on the pCPU on which the contender of the corresponding lock is executing, it is possible to reduce the waiting time and improve the operation efficiency.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A scheduling method of a virtual machine including an operating system (OS) and at least two virtual central process units (vCPU) operated by the OS on a physical device having and at least two physical CPUs (pCPU), the method comprising:
    acquiring, by a hypervisor, operating state information of a vCPU of the at least two vCPUs,
    acquiring lock information for resources of the OS corresponding to the vCPUs, the lock information including information regarding whether a vCPU is a holder related to a lock and information whether a vCPU is a contender related to the lock;
    identifying a vCPU of the at least two vCPUs being a lock holder based on the lock information indicating the vCPU is holding the lock within its critical section and a task related to the vCPU and the vCPU is executing at a first physical CPU (pCPU);
    identifying a vCPU of the at least two vCPUs being a lock contender based on the lock information indicating the vCPU is spinning for the lock as a function of the lock information during a time quantum of the lock holder vCPU and the lock contender vCPU is executing at a second physical CPU (pCPU);
    identifying whether the lock holder vCPU is in a lock holder preemption (LHP) state based on the operating state information of the lock holder vCPU indicates a preempted state and the contender vCPU is in a spinning state at the end of the time quantum, and
    before the beginning of a subsequent time quantum of the vCPUs, performing the steps of:
        selecting the pCPU of the contender vCPU as a destination pCPU; and
        migrating, the task related to the lock holder vCPU to the destination pCPU for the next time quantum execution.

2. The method of claim 1, wherein:
acquiring comprises:
 acquiring the state information in a form of a bitmap indicating whether the vCPU is in the running state or a preempted state,
wherein the information regarding the holder related to the lock includes at least one vCPU that has acquired a lock,
wherein the information on the contender related to the lock includes a list of vCPUs waiting release of the lock, and
wherein the lock information further includes a list of locks acquired by the at least one vCPU.

3. The method of claim 1, wherein acquiring comprises:
acquiring, at a virtual machine monitor (VMM) connected to the virtual machine and the first pCPU, the operation state information of the vCPU; and
acquiring, at the OS, the lock information of the OS.

4. The method of claim 1, wherein identifying comprises:
checking a lock acquired by a specific vCPU;
checking a vCPU waiting for release of the lock acquired by the specific vCPU; and
checking the operation state information of the vCPU waiting for release of the lock.

5. The method of claim 1, wherein identifying comprises:
detecting, if a specific vCPU fails acquiring a specific lock, an acquisition-failed lock;
checking another vCPU that acquired the acquisition-failed lock; and
checking the operation state information of the other vCPU that acquired the acquisition-failed lock.

6. The method of claim 1, wherein the second pCPU to which the task is migrated is the second pCPU that is executing a task of another vCPU waiting for release of the lock acquired by the vCPU in the LHP state.

7. An operation apparatus comprising:
a virtual machine including an operating system (OS) and at least two virtual central process units (vCPU) operated by the OS;
a physical machine including at least two physical CPUs (pCPU) configured to execute tasks requiring the virtual machine; and
a controller configured to:
 acquire, by a hypervisor, operating state information of a vCPU of the at least two vCPUs,
 acquire lock information for resources of the OS corresponding to the vCPUs, the lock information including information regarding whether a vCPU is a holder related to a lock and information whether a vCPU is a contender related to the lock;
 identify a vCPU of the at least two vCPUs being a lock holder based on the lock information indicating the vCPU is holding the lock within its critical section and a task related to the vCPU and the vCPU is executing at a first physical CPU (pCPU);
 identify a vCPU of the at least two vCPUs being a lock contender based on the lock information indicating the vCPU is spinning for the lock as a function of the lock information during a time quantum of the lock holder vCPU and the lock contender vCPU is executing at a second physical CPU (pCPU);
 identify whether the lock holder vCPU is in a lock holder preemption (LHP) state based on the operating state information of the lock holder vCPU indicates a preempted state and the contender vCPU is in a spinning state at the end of the time quantum, and
 before the beginning of a subsequent time quantum of the vCPUs, performing the steps of:
  selecting the pCPU of the contender vCPU as a destination pCPU; and
  migrating, the task related to the lock holder vCPU to the destination pCPU for the next time quantum execution.

8. The apparatus of claim 7, wherein the operation state information comprises a state information in a form of a bitmap indicating whether the vCPU is in the running state or a preempted state,
wherein the information regarding the holder related to the lock includes at least one vCPU that has acquired a lock,
wherein the information on the contender related to the lock includes a list of vCPUs waiting release of the lock, and
wherein the lock information further includes a list of locks acquired by the at least one vCPU.

9. The apparatus of claim 7, wherein the controller is configured to acquire the operation state information of the vCPU, and the OS acquires the lock information of the OS.

10. The apparatus of claim 7, wherein the controller is configured to check a lock acquired by a specific vCPU, a vCPU waiting for release of the lock acquired by the specific vCPU, and the operation state information of the vCPU waiting for release of the lock.

11. The apparatus of claim 7, wherein the controller is configured to detect, if a specific vCPU fails acquiring a specific lock, an acquisition-failed lock and checks another vCPU that acquired the acquisition-failed lock and the operation state information of the other vCPU that acquired the acquisition-failed lock.

12. The apparatus of claim 7, wherein the second pCPU to which the task is migrated is the second pCPU that is executing a task of another vCPU waiting for release of the lock acquired by the vCPU in the LHP state.

13. A non-transitory computer readable medium comprising program code that, if executed by a physical machine including at least two physical CPUs (pCPU) operating a virtual machine including an operating system (OS) and at least two virtual central process units (vCPU) operated by the OS, is configured to:
acquire, by a hypervisor, operating state information of a vCPU of the at least two vCPUs,
acquire lock information for resources of the OS corresponding to the vCPUs, the lock information including information regarding whether a vCPU is a holder related to a lock and information whether a vCPU is a contender related to the lock;
identify a vCPU of the at least two vCPUs being a lock holder based on the lock information indicating the vCPU is holding the lock within its critical section and a task related to the vCPU and the vCPU is executing at a first physical CPU (pCPU);
identify a vCPU of the at least two vCPUs being a lock contender based on the lock information indicating the vCPU is spinning for the lock as a function of the lock information during a time quantum of the lock holder vCPU and the lock contender vCPU is executing at a second physical CPU (pCPU);
identify whether the lock holder vCPU is in a lock holder preemption (LHP) state based on the operating state information of the lock holder vCPU indicates a preempted state and the contender vCPU is in a spinning state at the end of the time quantum, and before the beginning of a subsequent time quantum of the vCPUs, performing the steps of:
  selecting the pCPU of the contender vCPU as a destination pCPU; and
  migrating, the task related to the lock holder vCPU to the destination pCPU for the next time quantum execution.

14. The computer readable medium of claim 13, wherein the program code for acquiring comprises program code that, if executed by the at least one processor, is configured to cause the at least one processor to acquire the state information in a form of a bitmap indicating whether the vCPU is in the running state or a preempted state,
  wherein the information regarding the holder related to the lock includes at least one vCPU which has acquired a lock,
  wherein the information regarding the contender related to the lock includes a list of vCPUs waiting release of the lock, and
  wherein the lock information further includes a list of locks acquired by the at least one vCPU.

15. The computer readable medium of claim 13, wherein the program code for acquiring comprises:
  program code that, if executed by at least one processor, is configured to cause the at least one processor to acquire, at a Virtual Machine Monitor (VMM) connected to the virtual machine and the first pCPU, the operation state information of the vCPU; and
  program code that, if executed by at least one processor, is configured to cause the at least one processor to acquire, at the OS, the lock information of the OS.

16. The computer readable medium of claim 13, wherein the program code for identifying comprises:
  program code that, if executed by at least one processor, is configured to cause the at least one processor to check a lock acquired by a specific vCPU;
  program code that, if executed by at least one processor, is configured to cause the at least one processor to check a vCPU waiting for release of the lock acquired by the specific vCPU; and
  program code that, if executed by at least one processor, is configured to cause the at least one processor to check the operation state information of the vCPU waiting for release of the lock.

17. The computer readable medium of claim 13, wherein the program code for identifying comprises:
  program code that, if executed by at least one processor, is configured to cause the at least one processor to detect, if a specific vCPU fails acquiring a specific lock, an acquisition-failed lock;
  program code that, if executed by at least one processor, is configured to cause the at least one processor to check another vCPU that acquired the acquisition-failed lock; and
  program code that, if executed by at least one processor, is configured to cause the at least one processor to check the operation state information of the other vCPU that acquired the acquisition-failed lock.

18. The computer readable medium of claim 13, wherein the second pCPU to which a task is migrated is the second pCPU that is executing a task of another vCPU waiting for release of the lock acquired by the vCPU in the LHP state.

* * * * *

UNITED STATES PATENT AND TRADEMARK OFFICE
CERTIFICATE OF CORRECTION

Page 1 of 1

PATENT NO.       : 9,916,172 B2
APPLICATION NO.  : 14/383532
DATED            : March 13, 2018
INVENTOR(S)      : Jin Ho Lee et al.

It is certified that error appears in the above-identified patent and that said Letters Patent is hereby corrected as shown below:

On the Title Page

Item (73) Assignees:
Please add --SNU R&DB Foundation, Seoul (KR)--.

Signed and Sealed this
Twelfth Day of March, 2019

Andrei Iancu
*Director of the United States Patent and Trademark Office*